Aug. 9, 1949.  A. C. WINTERHALTER  2,478,517
SEISMIC DETECTOR
Filed March 25, 1947  2 Sheets-Sheet 1
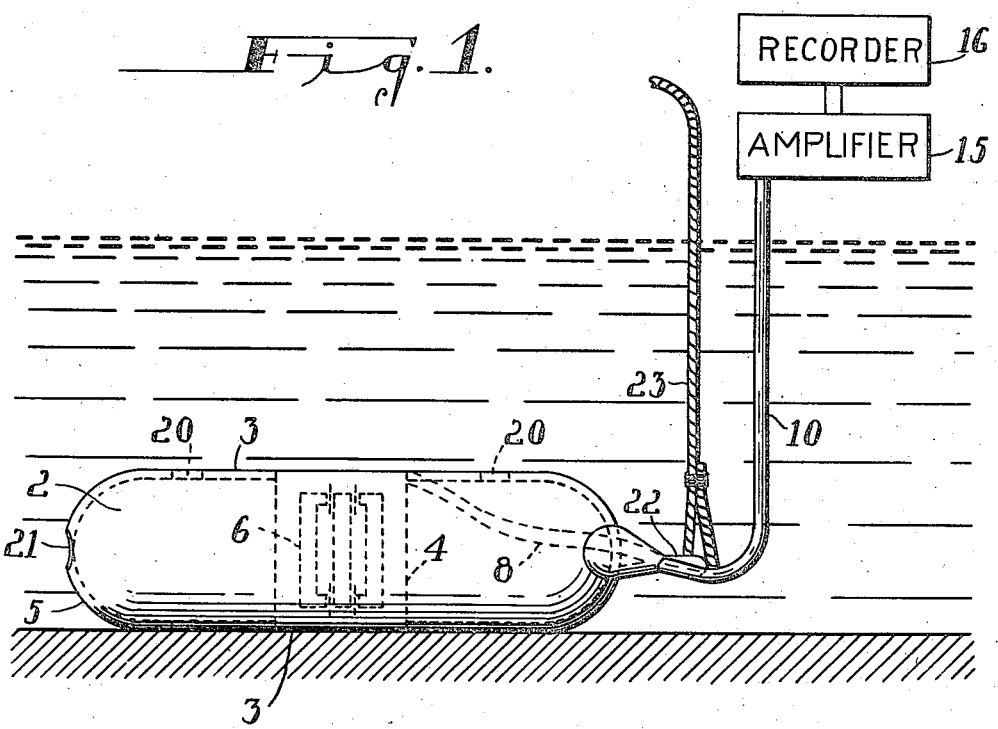
Fig. 1.
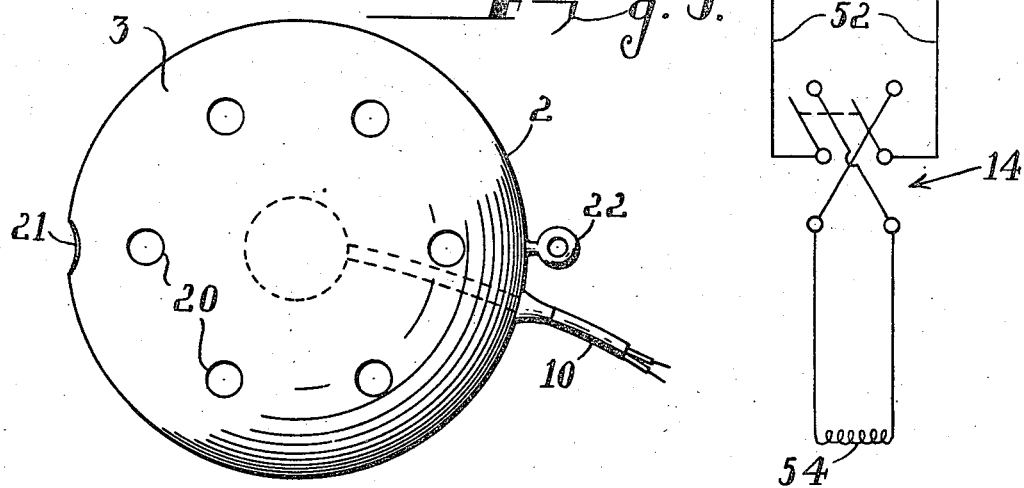
Fig. 5.
Fig. 2.
INVENTOR.
Alfred C. Winterhalter
BY
ATTORNEYS Aug. 9, 1949.  A. C. WINTERHALTER  2,478,517
SEISMIC DETECTOR Filed March 25, 1947  2 Sheets-Sheet 2

INVENTOR.
Alfred C. Winterhalter
BY
ATTORNEYS

Patented Aug. 9, 1949

2,478,517

UNITED STATES PATENT OFFICE 2,478,517

SEISMIC DETECTOR

Alfred C. Winterhalter, Beaumont, Tex., assignor to Sun Oil Company, Philadelphia, Pa., a corporation of New Jersey Application March 25, 1947, Serial No. 736,945

5 Claims. (Cl. 177—352)

This invention relates to improvements in seismic detectors for seismographic prospecting and more particularly to a seismic detector suitable for use underwater.

The use of seismic detectors which will produce voltages when the earth moves in a vertical direction is old. If the movement of the earth upward produces a positive voltage surge, then when it moves downward a negative voltage surge would be produced. Normally these voltages are recorded as oscillograph trace displacements giving graphic indications of the earth movements under the stimulus of an explosion at a shot point.

If the seismic detector were turned upside down, the resultant trace displacement for a given vertical movement of the earth would then be the opposite of that just stated. To correct this improper reversal of trace displacement due to inversion of the detector, it has been customary to use a manually operated switch by which the electrical output of the detector may be controlled to give a definite direction of trace displacement for a given direction of vertical earth motion irrespective of the position of the detector.

The use of such a manually controlled switch has been found to be unsatisfactory due to human errors. If the seismic detector can be placed in one of two positions, the switch must be correctly positioned or an erroneous record will result. Such errors are hard to detect and even if detected analysis is very difficult since the usual practice is to compare recordings made at different locations simultaneously. The great waste of money and time caused by such errors dictates that they should be prevented automatically. One object of the invention is to prevent such errors by automatic switching of the connections to the detector.

Seismic surveying of water covered areas has become of great commercial importance. To date, seismic detectors for underwater use have not been satisfactory. Detectors heretofore used must descend and rest on the bottom of a body of water in one designed position if they are to give interpretable trace displacements. They are expensive to build and unreliable in performance. Another object of my invention is, therefore, to simplify the design of underwater seismic detectors and achieve reliable recording from such underwater detectors. The detector in accordance with the invention is designed to assume either of two stable positions, and by the use of the automatic switch as indicated above, certainty of proper sign of the output is assured.

These and other objects will be apparent from the following description read in conjunction with the drawings in which:

Fig. 1 is a schematic view of an improved underwater type seismic detector together with its associated amplifier and recorder, the detector being illustrated in side elevation;

Fig. 2 is a top plan view of the underwater type seismic detector;

Fig. 5 is a diagram illustrating the connections of the gravity switch; and

Figure 4:
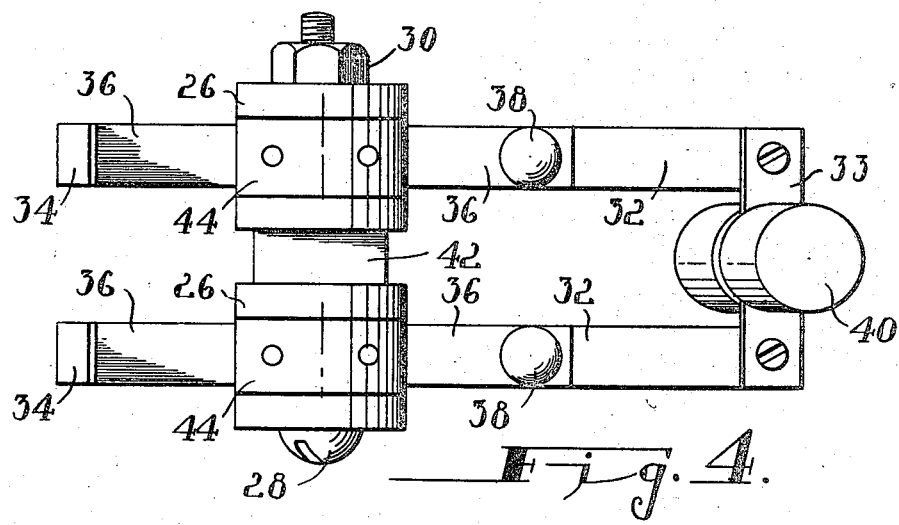
Fig. 4 is a plan view of the same.

Referring to Figs. 1 and 2, there is shown therein a circular hollow metal casing 2 with upper and lower flat surfaces 3 and rounded sides 5. In the center of the casing 2 is a water-tight compartment 4 containing a conventional seismic detector 6 and a gravity operated switch of the type hereafter described. The detector 6 may, for example, be of the type disclosed in the application of Henson, Serial Number 696,588, filed September 12, 1946. The axis of the detector is perpendicular to the flat surfaces 3 of the casing 2. Leading from the compartment 4 is a water-tight conduit 8 which carries an electrical cable 10 from the detector to the amplifier 15 and the recorder 16 which are conventional in structure and function. In particular, the recorder may be of multiple type, recording simultaneously the responses of a plurality of detectors. Wax or asphalt is used to seal the outer end of the conduit 8.

Holes 20 in the flat surfaces of the casing 2 permit the entry of water into the interior of the casing to provide for rapid descent of the detector and to assist in insuring that on reaching bottom the casing will turn and rest on one of its flat surfaces. Upon removal of the casing from the water, holes 20 act as drainage holes and hole 21 will insure that all water is drained out since this hole is opposite the hoisting eye 22 to which is secured the hoisting cable 23.

Figure 3:
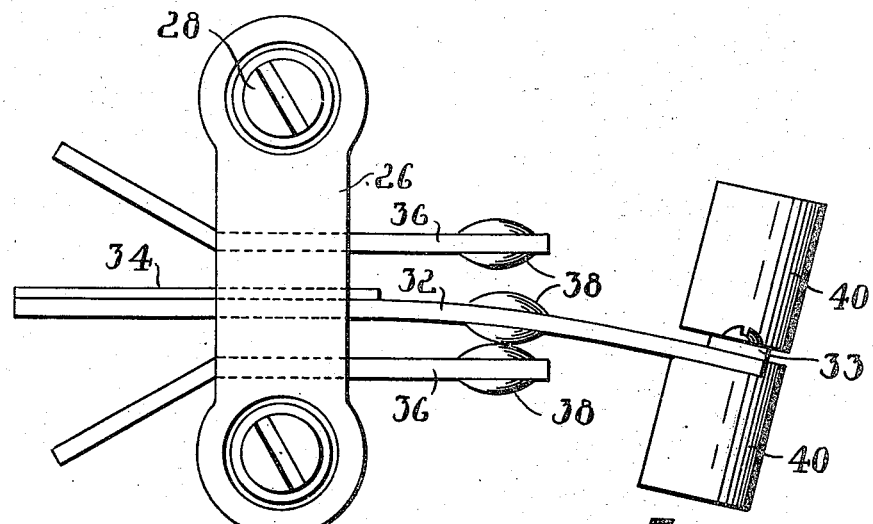
Fig. 3 is a side elevation of a weighted gravity switch.

As mentioned above, the compartment 4 contains a gravity operated switch. This switch is placed in the circuit leading from the detector to the amplifier 15. Such a switch is illustrated in Figs. 3 and 4. The brackets 26 together with bolts 28, nuts 30 and spacing members 42 act as holding clamps for members 44 which are non-conductors. Fixedly secured in members 44 are the flexible switch control arms 32, the supporting arms 34, and the contact members 36. The switch control arms 32 and the contact members 36 have contact elements 38. Weights 40 are secured to the ends of control arms 32 through the insulating cross-bar 33.

The gravity switch is so mounted in compartment 4 that the direction of movement of control arms 32 is parallel to the axis of the detector and consequently perpendicular to the flat surfaces of the casing 2.

The switch is of a double-pole double-throw type connected as illustrated in Figure 5 so as to reverse the connections from the detector coil 54 to the leads 52 of the cable 10. As will be evident, reversal of the position of the detector will reverse the connections so that irrespective of the detector position, an upward movement of the earth will always produce the same voltage surge.

Figure 6:
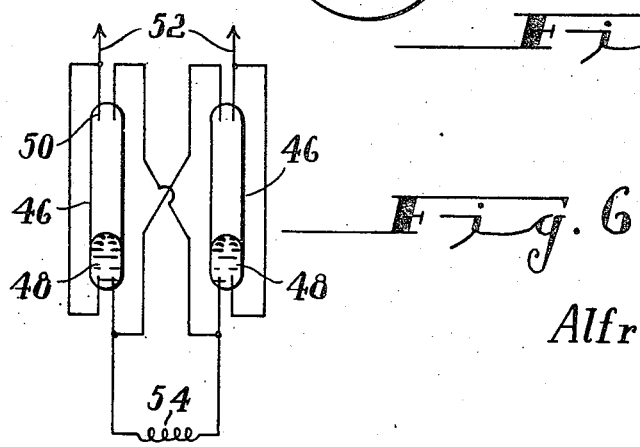
Fig. 6 is a schematic diagram of a mercury type gravity switch and its connections.

Fig. 6 shows an alternative mercury type of gravity switch which may be used. The closed glass tubes 46 contain globules of mercury 48. Sealed in each end of the tubes 46 are two electrodes 50. From the wiring indicated in Fig 6 it is apparent that the mercury responding to the force of gravity and flowing to the opposite ends of the tubes 46 would open the contact between one of the two sets of electrodes in the tubes 46 and make contact between the other set and thus reverse, in effect, the connections to the recorder. As will be evident, the switching is accomplished in the same fashion as by the use of the switch 14.

The seismic detecting device as described above is relatively simple and inexpensive to construct and operates effectively. Filling with water, the casing surrounding the water-tight compartment 4 gives a rapid descent. Due to the fact that the major portion of the detector's weight is concentrated near the geometric center of the case, there exists a strong leverage which will force the casing to turn onto one of its flat sides. It makes no difference which side rests on the bottom since the switch insures a proper sign for the signals.

While the automatic switching is particularly useful for under water work in which the detector position is not ascertainable by the observer, it will be evident that it is equally useful for surface operations in that inversion of the detector will receive automatic compensation in the circuit so that no note need be made by the operator of the planting position and he need indulge in no manual switching operation.

It should be noted that the gravity type switch can take numerous forms. For example a rotary switch could be used where the rotation is controlled by the force of gravity acting on a weight suitably attached to a rotating portion of the switch.

What I claim and desire to protect by Letters Patent is:

1. In combination, a seismic detector having output terminals and constructed and arranged to have two stable positions of rest on an approximately horizontal surface, the detector being inverted in one of said positions as compared with the other, leads for the transmission of electrical signals from the detector, and a gravity responsive switch mechanically connected to the detector and electrically connected between said output terminals and said leads to reverse the connections between said terminals and leads when the position of the detector is reversed from one stable position to the other, so that signals transmitted from the detector through said leads will have predetermined correspondence with earth movements.

2. In combination, a seismic detector having output terminals and constructed and arranged to have two stable positions of rest on an approximately horizontal surface, the detector being inverted in one of said positions as compared with the other, leads for the transmission of electrical signals from the detector, a gravity responsive switch mechanically connected to the detector and electrically connected between said output terminals and said leads to reverse the connections between said terminals and leads when the position of the detector is reversed from one stable position to the other, so that signals transmitted from the detector through said leads will have predetermined correspondence with earth movements, and a casing having only two flat surfaces of substantial area containing said detector and switch.

3. In combination, a seismic detector having output terminals and constructed and arranged to have two stable positions of rest on an approximately horizontal surface, the detector being inverted in one of said positions as compared with the other, leads for the transmission of electrical signals from the detector, and a gravity responsive double-pole double-throw reversing switch mechanically connected to the detector and electrically connected between said output terminals and said leads to reverse the connections between said terminals and leads when the position of the detector is reversed from one stable position to the other, so that signals transmitted from the detector through said leads will have predetermined correspondence with earth movements.

4. In combination, a seismic detector having output terminals and constructed and arranged to have two stable positions of rest on an approximately horizontal surface, the detector being inverted in one of said positions as compared with the other, leads for the transmission of electrical signals from the detector, and a gravity responsive double-pole double-throw mercury reversing switch mechanically connected to the detector and electrically connected between said output terminals and said leads to reverse the connections between said terminals and leads when the position of the detector is reversed from one stable position to the other, so that signals transmitted from the detector through said leads will have predetermined correspondence with earth movements.

5. In combination, a seismic detector having output terminals and constructed and arranged to have two stable positions of rest on an approximately horizontal surface, the detector being inverted in one of said positions as compared with the other, leads for the transmission of electrical signals from the detector, and a gravity responsive double-pole double-throw rersing switch having a weighted flexible contact arm and mechanically connected to the detector and electrically connected between said output terminals and said leads to reverse the connections between said terminals and leads when the position of the detector is reversed from the stable position to the other, so that signals transmitted from the detector through said leads will have predetermined correspondence with earth movements.

ALFRED C. WINTERHALTER.

REFERENCES CITED

The following references are of record in the file of this patent:

UNITED STATES PATENTS

| Number | Name | Date |
|---|---|---|
| 1,055,153 | Ferguson | Mar. 4, 1912 |
| 1,139,295 | Jones | May 11, 1915 |
| 1,625,625 | Ricker | Apr. 19, 1927 |
| 1,898,903 | Schroder | Feb. 21, 1933 |